United States Patent Office 3,466,379
Patented Sept. 9, 1969

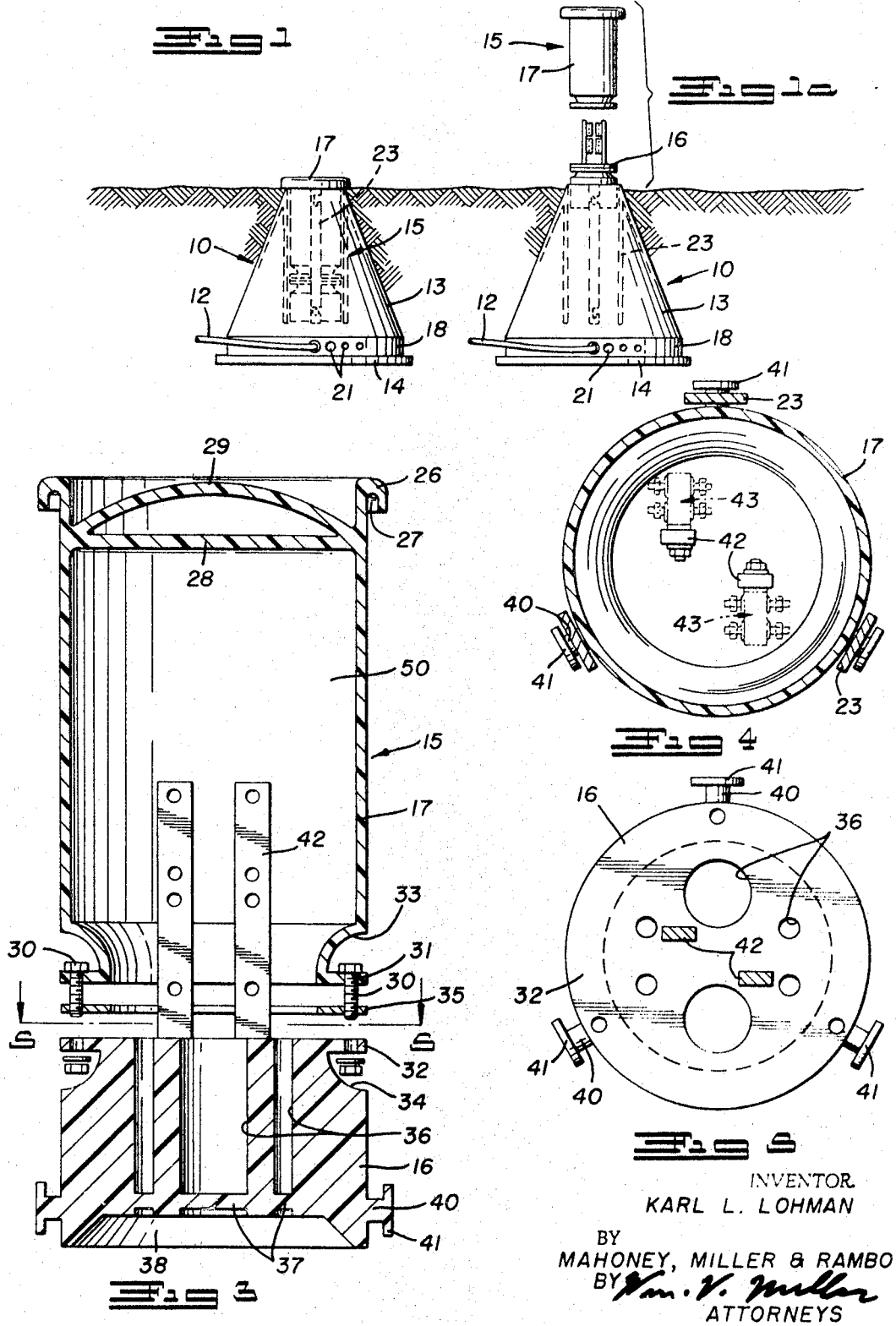

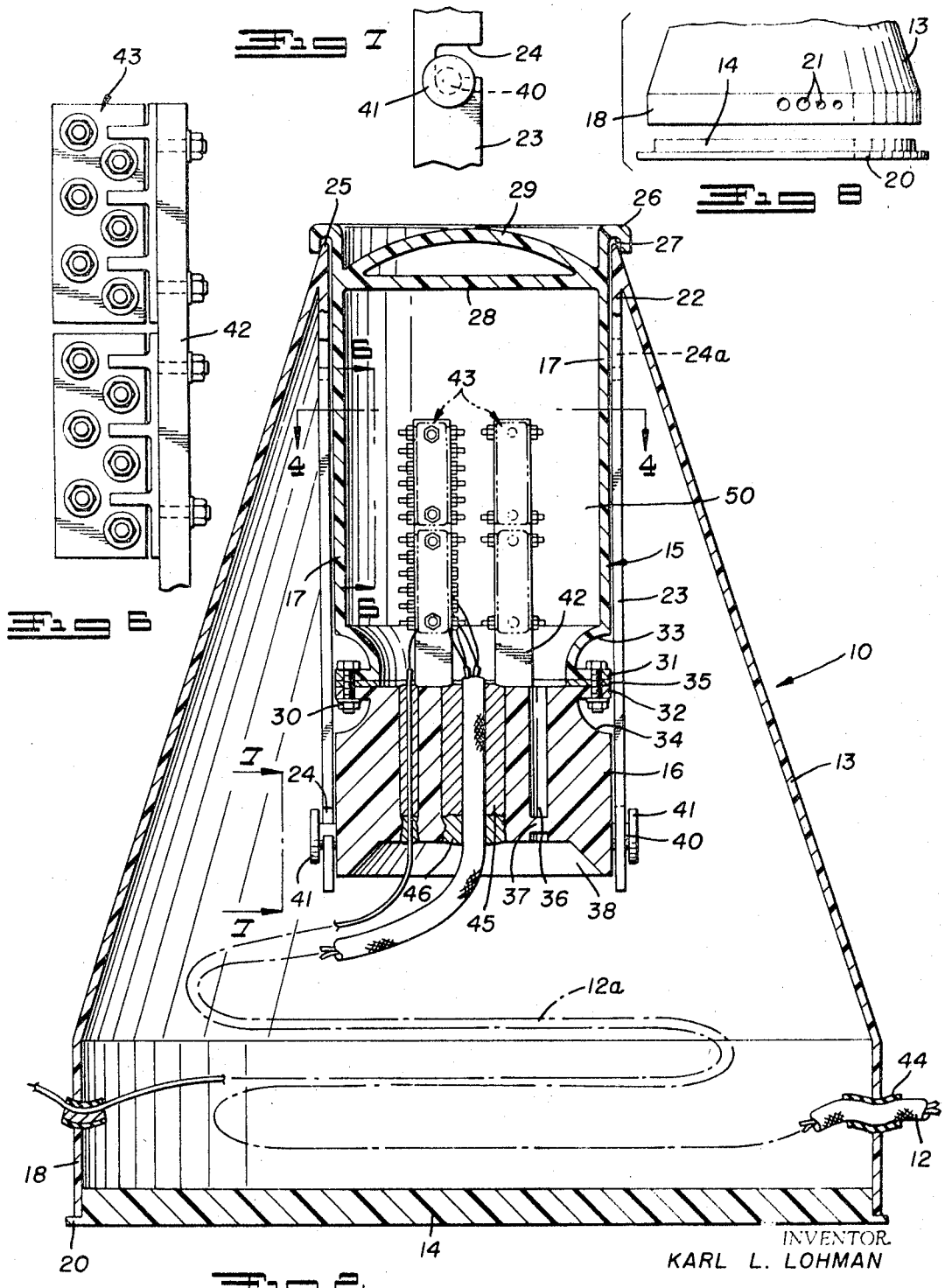

3,466,379
UNDERGROUND UTILITY CABLE OR
CONDUIT TERMINAL
Karl L. Lohman, 2100 Whitehall Drive,
Winter Park, Fla. 32789
Filed Aug. 25, 1967, Ser. No. 663,253
Int. Cl. H02g 9/00, 3/10
U.S. Cl. 174—38                 6 Claims

ABSTRACT OF THE DISCLOSURE

A terminal for receiving electrical or telephonic lines or cable or flexible conduit which can buried underground and still be readily accessible from the surface. It is designed so that pressure of surrounding ground will tend to keep it buried. It is further designed with a unit to which the cables are connected that can be readily withdrawn from a normal lower enclosed position within an outer housing to a readily exposed position accessible from the surface to facilitate changes in connections or maintenance. This connection unit is of such a fluid-tight design that pressurized cable or conduit can be connected thereto and the pressure will be maintained.

PRIOR ART, OBJECTS AND GENERAL DESCRIPTION

The readily accessible buried underground terminal of this invention can be used in the fields of telephony, electrical and community antenna television or educational television distribution systems. The use of this type, completely underground, terminal is to eliminate the usual pedestal type terminals which extend above the ground level by two or three feet, even when not being worked in, and the other buried type terminals which are not readily accessible from the surface.

The present invention is concerned with a novel and improved construction over other buried terminals or so-called junction boxes because it is not only flexible for many other uses, but will allow for cable pressurization throughout the cable distribution systems as well as feeder systems. The economics involved in being able to bury all utility-cable type plant and maintain an air pressuring system throughout is just beginning to appear in the utility field. The pressurizing feeder cables, telephone and power, has been going on for some time; however, the distribution systems off of the feeder systems have not been pressurized, due to the lack of a pressure tight terminal or junction box which will allow the continuous pressuring of other cables and systems encountered beyond the first terminal or junction box.

Advantages and objects of the terminal of this invention are as follows: Ease of access for installation and maintenance (ready access), concealment for improved appearance and safety from the elements, reduced maintenance costs, and ability to pressurize all buried cable facilities at will. The economics involved in being able to pressurize cable distribution systems are many, but the major areas are being able to bury single sheath cables for distribution instead of dual sheath cables (present industry procedure); and being able to detect cable damage and its location, using known methods to the industry, before the cable is damaged and lost due to moisture getting into the cable.

An object of this invention is to provide a completely underground ready access type terminal, which due to its design will resist any movement due to being used, or that of frost heaving, and at the same time allows for a pressurized area which can be used to feed air into other cables leaving the terminal chamber, or allow space in the pressurized chamber for placing bridge lifters, loading coils, repeaters or amplifiers.

Other objects of this invention are to provide a terminal or junction unit which is simple in design, easily serviced, rugged and weatherproof in construction, unobtrusive in appearance, economical to manufacture having only four basic parts which can be molded, lightweight, capable of withstanding considerable external forces and noncorrosive. The basic parts, preferably being made of molded PVC (polyvinyl chloride) make the terminal resistant to all chemicals normally found in soils and atmosphere, and durable, due to the fact that PVC has an excellent impact strength over a wide temperature range. This terminal will also serve as a good insulator, due to the fact that PVC is an electrical insulator and the thermal conductivity properties serve as an insulator between internal and external temperatures.

BRIEF DESCRIPTION OF DRAWINGS

In the accompanying drawings, a preferred embodiment of the invention has been illustrated but it is to be understood that specific variations in structure may be made without departing from basic principles of the invention.

In the drawings:

FIGURE 1 is a schematic view showing the terminal buried underground with the connector unit in normal enclosed, operating position.

FIGURE 1a is a similar view but showing the connector unit withdrawn upwardly to a position above the surface with its top casing or cap removed for servicing.

FIGURE 2 is a sectional view taken vertically through the entire terminal.

FIGURE 3 is a vertical sectional view taken through the connector unit removed from the outer housing showing the base and cap thereof disconnected and separated vertically.

FIGURE 4 is a horizontal sectional view taken along line 4—4 of FIGURE 2 through the connector unit.

FIGURE 5 is a horizontal sectional view taken along line 5—5 of FIGURE 3 through the connector unit.

FIGURE 6 is an enlarged fragmentary elevational view taken from the position indicated by line 6—6 of FIGURE 2 and showing a portion of one of the connector brackets of the connector unit.

FIGURE 7 is a fragmentary elevational view taken from the position indicated at line 7—7 of FIGURE 2 showing one of the bayonet-slot connections for securing the connector unit in its normal lower inoperative position within the housing.

FIGURE 8 is a fragmentary side elevational view of the housing indicating its construction.

DETAILED DESCRIPTION OF DRAWINGS

In the drawings, the terminal of this invention is illustrated as being used in connection with telephone equipment but it is not limited to such usage and may be employed whenever an underground terminal of this type is desired. The terminal is indicated generally by the numeral 10 in the drawings and may be used, as indicated above, in conjunction with telephony, electrical and community antenna television or educational television cable distribution systems. Such cable, indicated generally at 12, may or may not be pressurized systems, but the structure of this invention will permit the continuous pressurizations of all cables entering into or passing out of the terminal.

With specific reference to FIGURE 2 of the drawings, it will be apparent that the terminal of this invention is composed of four basic parts, preferably molded from PVC, as indicated above, and these parts being: The terminal and cable outer housing 13 which includes a separately molded base 14; and the connector unit 15 which includes the base 16 and the upper separable casing or cap 17.

The housing is of frusto-conical or upwardly converging, tapering form so that when buried with its larger end lowermost, the pressure of the surrounding earth will tend to keep it in its initially buried position. To facilitate molding, the base 14 is preferably made separately (FIGURE 8) in disc-like form and telescoped upwardly within the lower cylindrical skirt portion 18, upward telescoping being stopped by an annular peripherally projecting flange 20 on the base. The base 14 may be secured in place by treating the contacting surfaces of it and the skirt with a plastic solvent or cement before insertion. The skirt 18 is provided with a series of knock-out holes or slots 21 which may be of various sizes and which are normally closed by knock-out discs. The upper open end of the housing is provided with an internal, depending flange 22 which is provided with a series, preferably three, of angularly spaced, integral depending mounting arms or bars 23 which extend downwardly toward the base 14 but terminate at a level upwardly substantially therefrom, as shown best in FIGURE 2. Each arm has a lower bayonet slot 24 adjacent its lower end and a similar upper bayonet slot 24a near its junction with the flange 22. At the junction of the flange 22 and the upper end of the body of the housing, an annular support lip 25 results.

The connector unit 15 is adapted to be inserted as a unit downwardly through the upper open end of the conical housing 13 or withdrawn upwardly therethrough when desired. It is mainly a cylindrical tubular casing 17 of a diameter slightly less than the internal diameter of the housing internal flange 22 but is provided wtih a larger stop or support flange 26 at its upper end which has a downwardly opening socket 27 formed therein for fitting down over the housing lip 27. The upper end of the casing 17 is provided with an integral cap disc 28 recessed below its flanged upper end above which is provided an upwardly bowed hand grip 29 extending transversely thereof. The lower end of the casing 17 is detachably secured to the base 16 by means of a series of angularly spaced bolts 30 which extend vertically through aligned openings in the cooperating annular flanges 31 and 32 formed respectively on the members 17 and 16 by the annular access recesses 33 and 34 thereof. A pressure sealing gasket 35 is preferably provided between the flanges 31 and 32 to make the assembly fluid-tight. The connector base 16 is a substantially solid body of material but is provided with a series of vertically disposed cable passages 36 of various sizes which extend substantially completely through the base but are initially closed by integrally formed knock-out discs 37 which may be provided toward their lower ends. The bottom of the base 16 may be provided with a concavity or recess 38 leading into the lower ends of the passages 36. Adjacent the lower side of the base 16 at angularly spaced positions around its periphery integral detents or studs 40 are provided which project outwardly therefrom and each of which is substantially cylindrical with a flanged head 41 thereon. These studs are provided in the same number as the dependent retaining arms 23 in the housing 13 and are angularly spaced around the base to the same degree. The base 16 also preferably has molded as a part thereof the L-shaped brackets 42, each with one arm upstanding to provide a support for the usual standard cable connecting blocks 43 which may be bolted thereto as indicated in FIGURE 4.

In the use of this terminal, it is initially disposed in an excavation at the desired location and the desired cables 12 are passed into and out of the housing 13 through the proper openings 21 in the housing skirt 18. For each cable, the proper size opening is selected, depending on the outside diameter of the cable, the knock-out disc is removed and then a preformed grommet 44 is placed on the cable and is fitted, fluid-tight, into the opening, the grommet preferably being larger than the cable it surrounds and then being filled with an epoxy or other suitable resin which expands when it sets to make a fluid-tight fit around the cable. The cables are then connected to the connector unit 15 which has previously been inserted through the lower end of the housing before the base 14 is positioned therein. This connection may be done at the surface with the unit in its raised, locked position, as shown in FIGURE 1a, where the studs 40 are fitted in and retained by the upper bayonet slots 24a of the arms 23 carried by the housing. The casing or cap 17 is removed from the base 16 by removing the bolts 30 which will now be located at a level above the upper end of the housing 13 and be readily accessible. The connectors 43 will be exposed at this time, as indicated in FIGURE 1a. The base 16 will now be supported by the arms 23. The cables 12 will usually be fished upwardly through the passages 36 in the connector base 16 and then the passages are sealed by the use of epoxy resin 45 poured therein to fill the passage around the cable and the lower ends of the passages may be plugged temporarily with gum or putty 46 to retain the resin until it sets. It will be understood that the cables will have sufficient length to permit raising of the connector unit 15 to a position at the upper end of the housing 13 for the initial connection operation or servicing operation. The ends of the cables will be bared of insulation and connected to the connector blocks 43 in the usual manner. The base 16 and cap 17 are reassembled and the entire connector unit may now be dropped into the housing between the bars 23 until the cap flange 26 thereof rests on the upper lip 27 of the housing. The unit may be locked in place by rotation relative to the housing to cause the studs 40 to move into the open-ended slots 24. At this time, the cable will be in the form of a coil 12a or other convolute or twisted form in the base of the housing, as indicated in FIGURE 2.

It will be apparent that in use, the terminal will tend to stay put in the ground after the excavation is filled due to the shape of the housing 13. The connector unit 15 will be fluid-tight since, upon reassembly, the casing or cap 17 is mounted in a fluid-tight manner, by the clamping bolts 30 and gasket 35 on the connector base 16. There is consequently provided an inner fluid-tight chamber 50 within the unit 15 to which the cables 12 are connected by fluid-tight connections. Consequently, if the cables are pressurized, the pressure will be maintained during normal usage. Although the unit 15 is normally locked in a lower position downwardly within the housing, as shown in FIGURE 1, it can be withdrawn upwardly readily for servicing or maintenance of the cable connections or to remove or add cables. Usually, for maintenance it will merely be raised to the surface by grasping the handle 29, turning it slightly to clear the radial studs 40 from the slots 24, pulling the unit 15 upwardly until the studs are at a level corresponding to the slots 24 and then turning the unit in a reverse direction to position the studs in the slots 24a and hold the unit 15 in its raised position for removal of the cap 17, as shown in FIGURE 1a. This permits access to the connections 43. The pressure in the chamber 50 will be lost when the cap 17 is separated from the base 16 but will be rebuilt quickly after the members 16 and 17 are reassembled in a fluid-tight manner. Replacement of the connector unit 15 in its lower confined position within the housing 13 is readily possible by a reversal of this procedure.

It will be apparent that this invention provides a simple, yet effective, terminal that can be buried and will tend to stay buried. It can be made at a relatively low cost since it can be molded from plastic which will have many advantages as brought out above and as will be apparent. It will consist of a minimum number of parts which will provide for economical manufacture as well as ease of assembly and disassembly. It will provide for pressurization of cables connected thereto, if desired. Its structure is such that it will normally be effectively locked in the housing below ground but can be readily withdrawn for access from above the ground surface.

Various other advantages will be apparent.

I claim:

1. A subterranean utility cable terminal comprising a hollow, generally frusto-conical housing having an upper, annular, open end; a generally cylindrical inner connector unit moveable vertically at least partially through the upper open end of said housing from a lower, normally, retracted, operative position within said housing to an upwardly extended servicing position adjacent the open end of said housing, said connector unit including a cylindrical base section having cable-connecting mounts, a relatively separable, tubular cap section having a closed upper end and an open lower end, and clamping means for connecting the lower end of the cap section to the base section in enclosing relation to the cable-connecting mounts; and means within said housing for mounting said connector unit for vertical movement therein including releasable retaining means having interfitting connections between said connector unit and said housing for holding said connector unit either in its retracted operative position, or in its upwardly extended servicing position, said interfitting connections being releasable by partial rotation of said connector unit relative to said housing.

2. A terminal according to claim 1, wherein said connector unit further includes a sealing gasket between the lower end of the tubular cap section and the base section.

3. A terminal according to claim 1, wherein said housing is provided with one or more cable passages and the base section of said connector unit is formed with passage means through which a cable may be passed and sealed and electrically connected with the cable-connecting mounts of said base section with sufficient slack in the cable to permit vertical movement of said connector unit within said housing.

4. A terminal according to claim 3 in which said housing has a chamber below said connector unit when the latter occupies its lower, retracted position in which a cable is normally coiled.

5. A terminal according to claim 1, wherein the interfitting connections between said housing and said connector unit comprise supporting members carried by said housing and having sets of open-ended, stud-receiving slots at different levels with the slots opening horizontally, and radial studs carried by the base section of said connector unit and adapted to be positioned in or removed from the slots of either of said sets by positioning the studs at the selected level and rotating said connector unit relative to said supporting members.

6. A terminal according to claim 5, wherein said housing is formed around its upper open end with a support lip, and wherein said supporting members comprise a plurality of angularly spaced, depending arms having the slots formed therein at one edge and opening horizontally all in the same direction, the cap section of said connector unit having a support flange normally resting on the support lip of said housing, and wherein the studs on the base section of said connector unit are arranged in angularly spaced positions corresponding to the angular spacing of said arms.

References Cited

UNITED STATES PATENTS

| 239,560 | 3/1881 | Sewall | 174—38 |
| 343,458 | 6/1886 | Hull. | |
| 2,196,842 | 4/1940 | Strazzabosco | 339—34 |
| 2,811,574 | 10/1957 | Guerrero | 174—48 X |

FOREIGN PATENTS

| 599,844 | 11/1959 | Italy. |

OTHER REFERENCES

Wittenberg: German printed application No. 1,044,921, published Nov. 27, 1958.

LARAMIE E. ASKIN, Primary Examiner

U.S. Cl. X.R.

174—48, 59; 339—34